(12) United States Patent
Kitagawa

(10) Patent No.: US 11,919,595 B2
(45) Date of Patent: Mar. 5, 2024

(54) INERTIAL SENSOR ATTACHMENT STRUCTURE AND MOTORCYCLE

(71) Applicant: SUZUKI MOTOR CORPORATION, Hamamatsu (JP)

(72) Inventor: Yuji Kitagawa, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 1058 days.

(21) Appl. No.: 16/790,038

(22) Filed: Feb. 13, 2020

(65) Prior Publication Data

US 2020/0180722 A1    Jun. 11, 2020

Related U.S. Application Data

(63) Continuation of application No. 15/793,695, filed on Oct. 25, 2017, now Pat. No. 10,597,108, which is a
(Continued)

(30) Foreign Application Priority Data

Jul. 6, 2015    (JP) .................................. 2015-135131

(51) Int. Cl.
| | |
|---|---|
| *B62J 45/42* | (2020.01) |
| *B60T 8/36* | (2006.01) |
| *B60T 8/32* | (2006.01) |
| *B62K 11/02* | (2006.01) |
| *B62K 11/04* | (2006.01) |

(Continued)

(52) U.S. Cl.
CPC ............. *B62J 45/42* (2020.02); *B60T 8/3685* (2013.01); *B60T 8/3225* (2013.01); *B62K 11/02* (2013.01); *B62K 11/04* (2013.01); *B62K*

*25/30* (2013.01); *B62K 2201/02* (2013.01); *B62L 3/023* (2013.01); *B62L 3/04* (2013.01);
(Continued)

(58) Field of Classification Search
CPC ........ B62J 45/42; B62J 45/413; B62J 45/414; B62J 45/415
See application file for complete search history.

(56) References Cited

U.S. PATENT DOCUMENTS

| | | | |
|---|---|---|---|
| 4,697,825 A | 10/1987 | Hayashi | ......................... 188/181 |
| 4,702,339 A | 10/1987 | Hayashi | ......................... 180/219 |

(Continued)

FOREIGN PATENT DOCUMENTS

| | | | | |
|---|---|---|---|---|
| CA | 2716021 A1 | * | 8/2009 | ............... B60B 7/02 |
| CA | 2781533 A1 | * | 5/2011 | ............. H05K 3/325 |

(Continued)

OTHER PUBLICATIONS

Notifications of Reasons for Refusal dated Sep. 13, 2018, issued by the Japanese Patent Office in corresponding application JP 2015-135131.
(Continued)

*Primary Examiner* — Kevin Hurley
(74) *Attorney, Agent, or Firm* — Stein IP, LLC

(57) ABSTRACT

The invention is directed to an inertial sensor attachment structure including: a floating bracket which is fixed to a vehicle body frame via a vibration absorbing member; an inertial sensor attached to a first attachment surface of the floating bracket; and an ABS unit attached to a second attachment surface of the floating bracket.

12 Claims, 6 Drawing Sheets

Related U.S. Application Data continuation of application No. 15/201,940, filed on Jul. 5, 2016, now Pat. No. 9,802,589.

(51) Int. Cl.

| | |
|---|---|
| B62K 25/30 | (2006.01) |
| B62L 3/02 | (2006.01) |
| B62L 3/04 | (2006.01) |
| F16F 7/00 | (2006.01) |
| F16F 7/108 | (2006.01) |
| G01D 11/30 | (2006.01) |
| G01P 1/02 | (2006.01) |

(52) U.S. Cl.
CPC .............. *F16F 7/00* (2013.01); *F16F 7/108* (2013.01); *G01D 11/30* (2013.01); *G01P 1/023* (2013.01)

(56) References Cited

U.S. PATENT DOCUMENTS

| | | | | |
|---|---|---|---|---|
| 5,038,613 | A * | 8/1991 | Takenaka | G01C 19/5607 73/510 |
| 5,141,193 | A | 8/1992 | Behr | 248/309.1 |
| 5,419,625 | A | 5/1995 | Iwase et al. | 303/116.1 |
| 6,182,508 | B1 * | 2/2001 | Takeuchi | G01C 19/5607 310/326 |
| 8,001,839 | B2 * | 8/2011 | Sugihara | G01P 1/023 73/510 |
| 8,002,066 | B2 | 8/2011 | Harada | 180/219 |
| 9,592,799 | B2 | 3/2017 | Iyatani | |
| 10,112,673 | B2 | 10/2018 | Kitagawa | |
| 2007/0145227 | A1 | 6/2007 | Hasegawa | 248/637 |
| 2015/0314781 | A1 | 11/2015 | Klews | 701/71 |
| 2015/0329072 | A1 | 11/2015 | Freienstein | 701/49 |
| 2015/0353151 | A1 | 12/2015 | Klews | 74/5.22 |
| 2016/0368546 | A1 | 12/2016 | Wahl | |
| 2017/0057578 | A1 | 3/2017 | Kitagawa | |
| 2019/0256348 | A1 * | 8/2019 | Mitchell | H05K 1/0216 |

FOREIGN PATENT DOCUMENTS

| | | | | |
|---|---|---|---|---|
| CN | 102771201 | A * | 11/2012 | ............ A63H 27/12 |
| CN | 102818569 | A * | 12/2012 | |
| CN | 103424107 | B * | 6/2019 | ........... B81B 3/0018 |
| CN | 110470290 | A * | 11/2019 | ........... B81B 3/0018 |
| DE | 60 2005 001 496 | T2 | 3/2008 | |
| EP | 1 679 243 | A1 | 7/2006 | |
| EP | 2130731 | A2 | 12/2009 | |
| EP | 2458242 | A2 * | 5/2012 | ............. G01D 11/10 |
| JP | H 06-329006 | A | 11/1994 | |
| JP | H 8-113179 | A | 5/1996 | |
| JP | 2007-55422 | A | 3/2007 | |
| JP | 2009-292350 | A | 12/2009 | |
| JP | 2011-238638 | A | 11/2011 | |
| JP | 2014-169077 | A | 9/2014 | |
| JP | 2018105488 | A * | 7/2018 | |

OTHER PUBLICATIONS

Creation of various functions in Toru Kitsunai, Yutaka Yamagata, Toshikatsu Koike, and aluminum frame for two-wheeled vehicles, light metal, Japan, Japan Institute of Light Metals, Jul. 2006, 56th vol., No. 4, pp. 233-239.

Japanese Office Action dated Mar. 5, 2019, issued to Japanese Application No. 2018-077483.

German Office Action dated Apr. 5, 2023, issued by the German Patent and Trademark Office in corresponding application DE 102016008141.4.

* cited by examiner

INERTIAL SENSOR ATTACHMENT STRUCTURE AND MOTORCYCLE

CROSS-REFERENCE TO RELATED APPLICATIONS

This application is a continuation of U.S. application Ser. No. 15/793,695, flied Oct. 25, 2017, now allowed, which is a continuation of U.S. application Ser. No. 15/201,940, filed on Jul. 5, 2016, now issued as U.S. Pat. No. 9,802,589 on Oct. 31, 2017, which claims the benefit of priority to Japanese Patent Application No. 2015-135131, flied Jul. 6, 2015, the entire contents of which is hereby incorporated by reference, the same as if set forth at length.

FIELD OF THE INVENTION

The present invention relates to an attachment structure including an inertial sensor that is used for ABS control and a motor cycle equipped with the attachment structure.

BACKGROUND OF THE INVENTION

In general, motorcycles are equipped with an ABS (antilock brake system) unit to prevent wheel locking at the time of sudden braking. The ABS unit receives detection signals from wheel speed sensors for detecting wheel speeds and an inertial sensor for detecting acceleration and an angular velocity and other signals, and controls brake pressures for front and rear wheels on the basis of the detection signals (refer to JP-A-2009-292350, for example). Since inertial sensors of this type should satisfy strict vibration conditions, a vibration preventive measure is taken in which a bracket of the inertial sensor is supported by a vehicle body frame in a floated manner via vibration absorbing members. Vibration coming from the vehicle body frame is absorbed by the vibration absorbing members, whereby vibration to travel to the inertial sensor is suppressed.

SUMMARY OF THE INVENTION

However, there are vehicles in which vibration conditions for an inertial sensor are not satisfied merely by the above-described floating support using vibration absorbing members. In these cases, it is necessary to review the layout involving the inertial sensor so that it is installed at such a location to which vibration coming from the vehicle body frame is less prone to travel. This may restrict the layout involving the inertial sensor.

The present invention has been made in the above circumstances, and an object of the invention is therefore to provide an inertial sensor attachment structure that can sufficiently suppress vibration to travel to the inertial sensor though being simple in configuration as well as a motorcycle equipped with it.

An inertial sensor attachment structure of the present invention is characterized by comprising: a floating bracket which is fixed to a vehicle body frame via a vibration absorbing member; an inertial sensor attached to a first attachment surface of the floating bracket; and an ABS unit attached to a second attachment surface of the floating bracket.

With this configuration, since the floating bracket is supported by the vehicle body frame in a floated manner via the vibration absorbing member, vibration coming from the vehicle body frame is absorbed by the vibration absorbing member. The floating bracket is made less prone to vibrate because the total weight of what are supported by the floating bracket is increased by attaching the ABS unit and the inertial sensor to the floating bracket. Therefore, vibration coming from the vehicle body frame is made less prone to travel to the inertial sensor, which means that an effective vibration preventive measure has been taken for the inertial sensor. Furthermore, the layout involving the inertial sensor is not restricted by the vibration preventive measure and, instead, is increased in the degree of freedom. Still further, since the floating bracket is shared by the ABS unit and the inertial sensor, it is not necessary to use separate brackets for them and hence the number of components is reduced, thus enabling reduction in weight and cost.

The inertial sensor attachment structure of the present invention further comprises another vibration absorbing member sandwiched between the inertial sensor and the first attachment surface of the floating bracket. With this configuration, since the inertial sensor is supported by the vehicle body frame in a doubly floated manner, the transmission of vibration from the vehicle body frame to the inertial sensor can be suppressed more effectively. Furthermore, while the ABS unit is driven, vibration to travel from the ABS unit to the inertial sensor can be suppressed because it is absorbed by the other vibration absorbing member.

In the inertial sensor attachment structure of the present invention, the first attachment surface and the second attachment surface are a back surface and a top surface of the floating bracket, respectively. In this configuration, the inertial sensor is attached to the back surface of the floating bracket and the ABS unit is attached to the top surface of the floating bracket. Therefore, both surfaces of the plate-like floating bracket can be used effectively as component attachment surfaces, which facilitates arrangement of components and enables space saving. Furthermore, since the ABS unit and the inertial sensor are arranged so as to overlap with each other in a plan view, vibration of the inertial sensor can be suppressed by bringing the center of gravity of the inertial sensor closer to that of the ABS unit.

In the inertial sensor attachment structure of the present invention, the floating bracket is disposed near the center of the vehicle body frame. With this configuration, since the inertial sensor is disposed near the center of gravity of the vehicle body unit, the detection accuracy of the inertial sensor can be increased in a sense of including the accuracy of detection of a variation in vehicle posture.

A motorcycle of the present invention is characterized by comprising the inertial sensor attachment structure. With this configuration, an effective vibration preventive measure can be taken for the ABS unit and the inertial sensor. In the motorcycle, the layout involving the ABS unit and the inertial sensor can be increased in the degree of freedom.

In the inertial sensor attachment structure according to the invention, the ABS unit and the inertial sensor are attached to the floating bracket, which is an effective vibration preventive measure taken for the inertial sensor. In the motorcycle, the layout involving the inertial sensor can be increased in the degree of freedom.

DESCRIPTION OF SYMBOLS

1: Vehicle body frame
20: ABS unit
51: Floating bracket
52: Top surface of floating bracket (second attachment surface)
53: Back surface of floating bracket (first attachment surface)
61: Rubber bush (vibration absorbing member)
70: Inertial sensor
73: Rubber sheet (another vibration absorbing member)

DETAILED DESCRIPTION OF THE INVENTION

Figure 1:
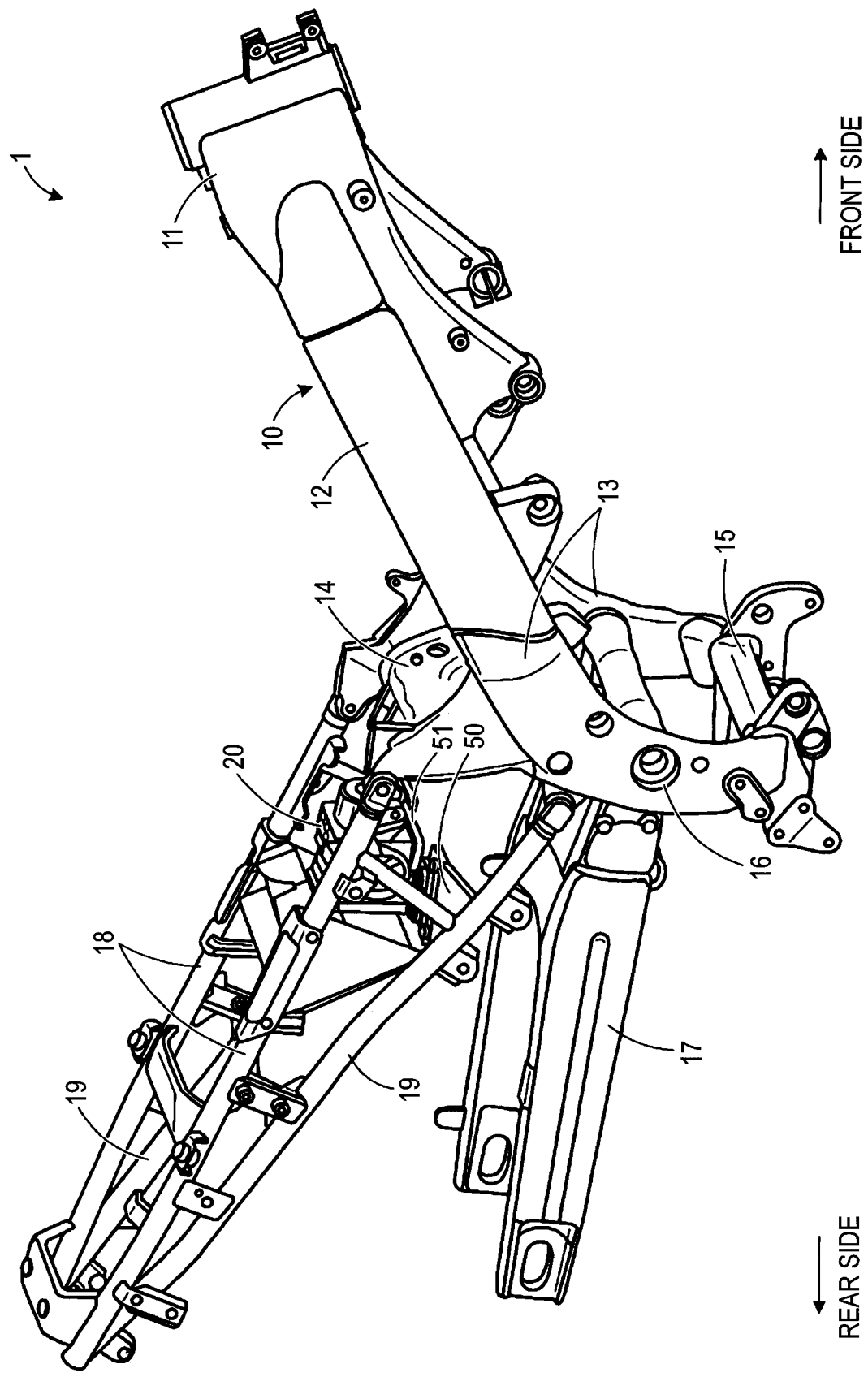
FIG. 1 is a perspective view of a vehicle body frame employed in an embodiment of the present invention.
Figure 2:
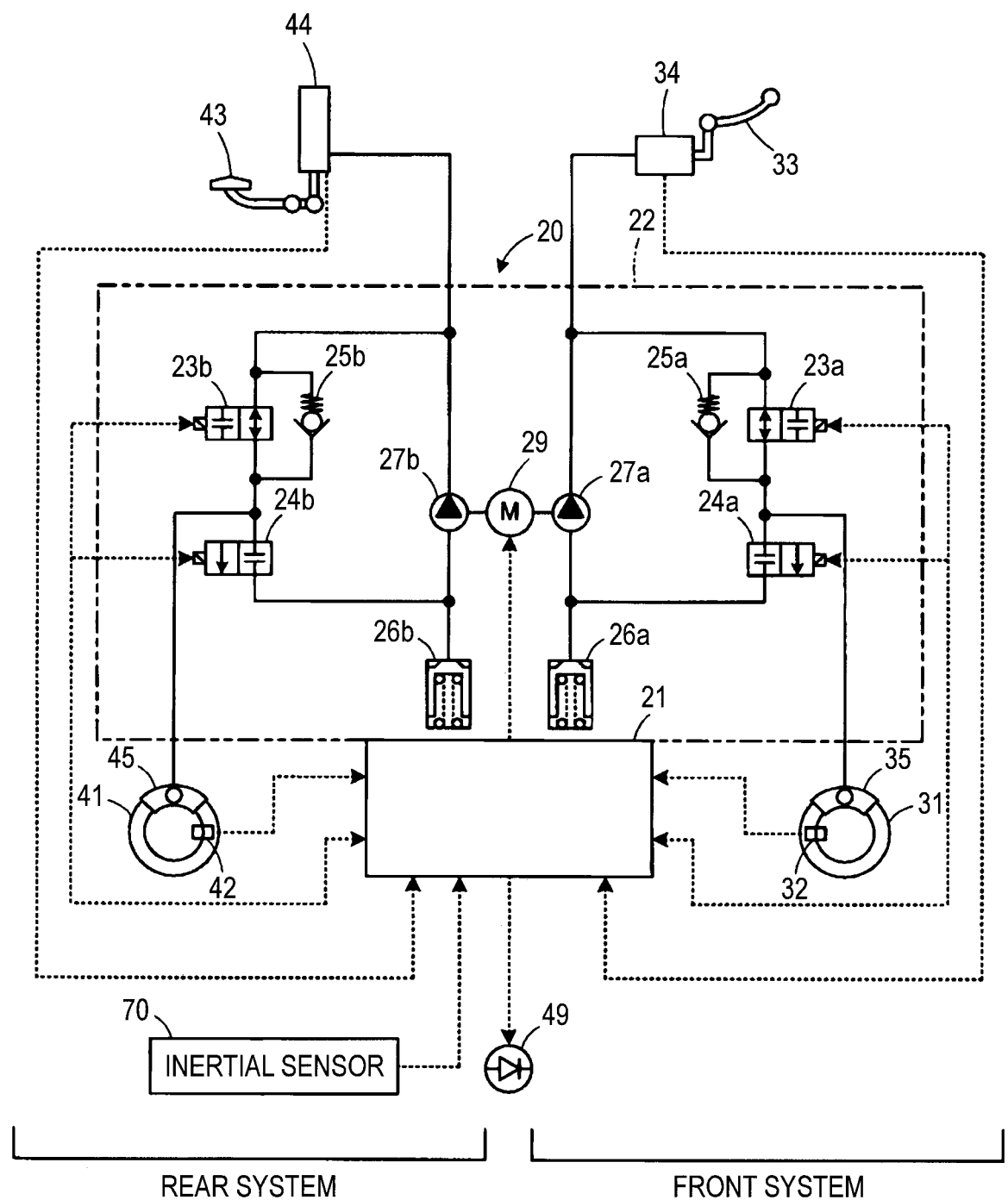
FIG. 2 is a system image diagram of ABS that relates to the embodiment.

An embodiment of the present invention will be hereinafter described in detail with reference to the accompanying drawings. Although the embodiment will be directed to an inertial sensor attachment structure that is applied to a motorcycle, the application field of the invention is not limited to motorcycles and includes such saddle-ridden vehicles as tri-wheel vehicles. FIG. 1 is a perspective view of a vehicle body frame employed in the embodiment. FIG. 2 is a system image diagram of ABS that relates to the embodiment.

As shown in FIG. 1, a vehicle body frame 1 is formed by attaching seat rails 18 and subframes 19 to a twin-spar frame 10 which is mounted with various electric units etc. and made of steel or an aluminum alloy. In the twin-spar frame 10, a pair of, that is, left and right, tank rails 12 branch off from a head frame 11 located at the front end and extend rearward and a pair of body frames 13 extend downward from the rear ends of the tank rails 12, respectively. The head frame 11, the tank rails 12, and the body frames 13 form an accommodation space for an engine (not shown) etc. The vehicle body frame 1 is reinforced by suspending the engine on them.

The pair of body frames 13 are linked to each other by an upper bridge 14 on the upper side and by a lower bridge 15 on the lower side. The pair of body frames 13 are formed with respective swing arm pivots 16 to which respective swing arms 17 which support a rear wheel (not shown) are connected so as to be swingable in the vertical direction. A top portion of a rear cushion unit (not shown in drawings) for suspension of the rear wheel is connected to the upper bridge 14, and a bottom portion of the rear cushion unit is linked to the lower bridge 15 and the swing arms 17 by link mechanisms.

The pair of seat rails 18 which extend up rearward are connected to top portions of the pair of body frames 13, respectively. The pair of seat rails 18 are supported auxiliarily by the respective subframes 19 which connect intermediate portions, in the height direction, of the body frames 13 and rear end portions of the seat rails 18. A front space that is surrounded by the pair of seat rails 18 and the pair of subframes 19 is an accommodation space for an ABS unit 20. The ABS unit 20 is disposed in this accommodation space and is located, in the vehicle front-rear direction, at a position that is in the rear of the rear cushion unit and in front of the front end of the rear wheel. A pair of frame brackets 50 project inward from the respective subframes 19. The ABS unit 20 is attached to the top surface (upper surface) of a floating bracket 51 which is a plate-like member and suspended so as to link the pair of frame brackets 50. Alternatively, one or both of the frame brackets 50 may be disposed so as to project inward from the seat rail(s) 18.

As shown in FIG. 2, the ABS unit 20 detects wheel speeds with wheel speed sensors 32 and 42 which are attached to a front wheel 31 and a rear wheel 41, respectively, and controls braking automatically to prevent wheel locking. The ABS unit 20 is an integrated unit consisting of a control unit 21 and a hydraulic unit (HU) 22. The hydraulic unit 22 has a hydraulic circuit that is divided into a front system and a rear system, that is, separate systems for the front wheel 31 and the rear wheel 41. More specifically, the hydraulic unit 22 includes inlet solenoid valves 23a and 23b, outlet solenoid valves 24a and 24b, one-way valves 25a and 25b, reservoirs 26a and 26b, and pumps 27a and 27b which belong to the respective systems.

In the front system, hydraulic pressure supplied from a master cylinder 34 manipulated by a front brake lever 33 acts on front brake calipers 35 via the inlet solenoid valve 23a. If a sudden drop of a rotation speed of the front wheel 31 is detected, the inlet solenoid valve 23a shuts off the transmission of hydraulic pressure from the master cylinder 34 and the hydraulic pressure is lowered by having brake oil released from the front brake calipers 35 to the reservoir 26a by opening the outlet solenoid valve 24a. Oil that has stayed temporarily in the reservoir 26a is sucked by the pump 27a and thereby returned to the master cylinder 34 side. In the rear system, hydraulic pressure supplied from a master cylinder 44 manipulated by a rear brake pedal 43 is controlled in the same manner as in the front system.

A control unit 21 is composed of an input-side interface, an output-side interface, a processor, a memory, etc. The memory consists of one or plural ones of a ROM (read-only memory), a RAM (random access memory), etc. depending on a use. The memory is stored with various programs and various parameters of the ABS control. A brake light switch, the wheel speed sensors 32 and 42, the inertial sensor 70, etc. are connected to the input-side interface. The solenoid valves 23a, 23b, 24a, and 24b, an indicator lamp 49, a motor 29, etc. are connected to the output-side interface.

In the ABS unit 20, the solenoid valves 23a, 23b, 24a, and 24b and the motor 29 are controlled on the basis of wheel speeds of the front wheel 31 and the rear wheel 41 detected by the wheel speed sensors 32 and 4242 and acceleration and an angular velocity or the like detected by an inertial sensor 70. More specifically, if the wheel speeds of the front wheel 31 and the rear wheel 41 have become low relative to a vehicle body speed, the ABS unit 20 prevents wheel locking by controlling the maintenance and reduction of brake pressures. On the other hand, if the wheel speeds of the front wheel 31 and the rear wheel 41 have become close to a vehicle body speed, the ABS unit 20 performs a control so as to increase brake pressures. By repeating such controls, proper deceleration can be attained without locking of the front wheel 31 and the rear wheel 41 even on, for example, a slippery road surface.

Figure 3:
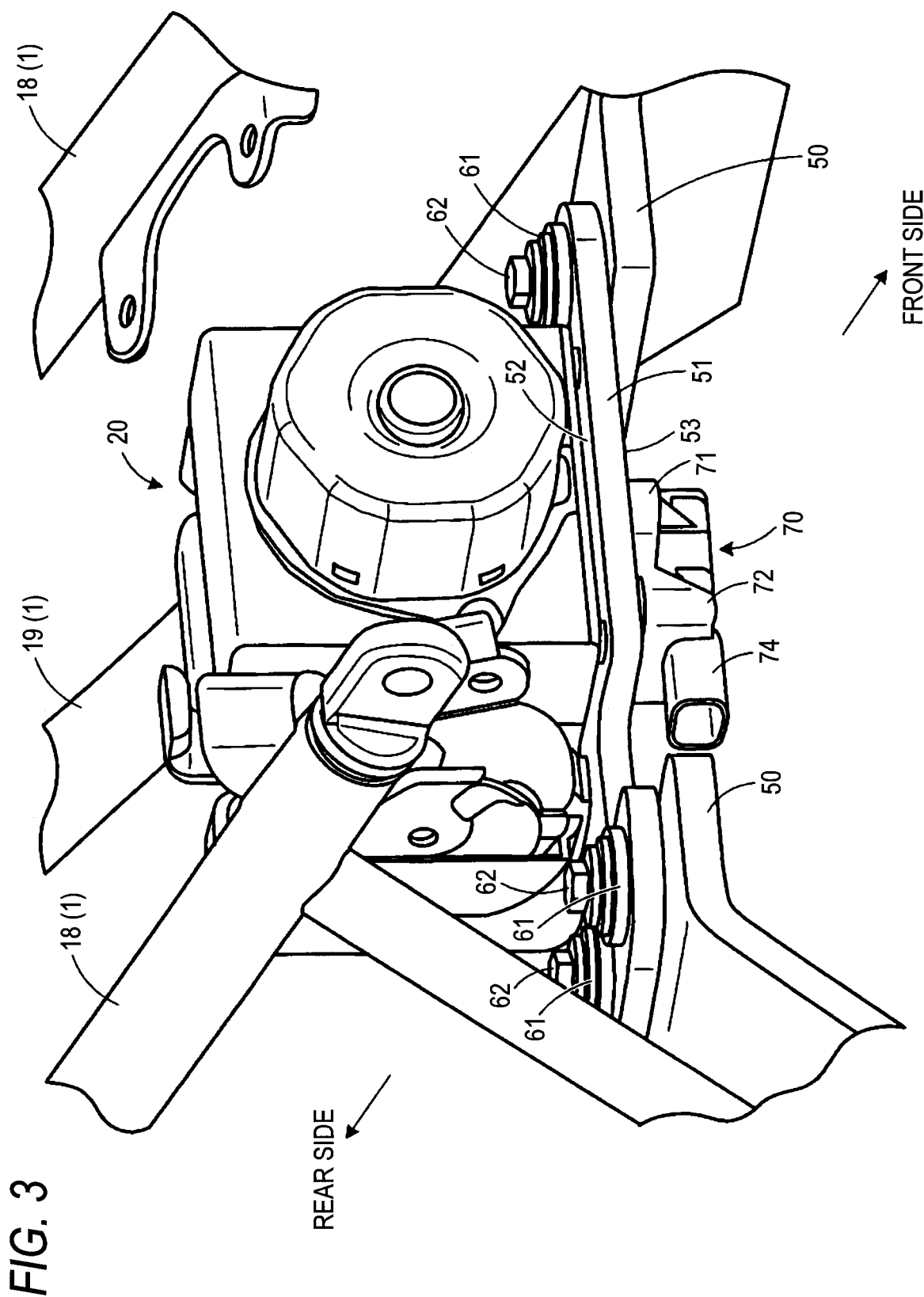
FIG. 3 is a perspective view of an ABS unit attachment structure according to the embodiment.

Incidentally, as a vibration preventive measure for the ABS unit 20, the floating bracket 51 to which the ABS unit 20 is attached is supported by the pair of frame brackets 50 in a floated manner via rubber bushes 61 (see FIG. 3). Since the inertial sensor 70 which is used for the ABS unit 20 should satisfy strict vibration conditions, it preferable that the inertial sensor 70 be also supported by the vehicle body frame 1 in a floated manner. However, vibration that travels from the body frame 1 to the inertial sensor 70 may not be absorbed sufficiently merely by the floating support to cause a situation that the vibration conditions for the inertial sensor 70 are not satisfied. Furthermore, to attach inertial sensor 70 to the vehicle body frame 1, it is necessary to use a separate bracket.

In the embodiment, the inertial sensor 70 is attached to the same floating bracket 51 to which the ABS unit 20 is attached and the weight of the components supported by the floating bracket 51 is thereby increased, whereby the natural frequency is lowered and the floating bracket 51 is made less prone to vibrate. This is not only a vibration preventive measure for the ABS unit 20 but also an effective vibration preventive measure for the inertial sensor 70. Furthermore, since the same floating bracket 51 is shared by the ABS unit 20 and the inertial sensor 70, it is not necessary to use separate brackets for them and hence the number of components is reduced, thus enabling reduction in weight and cost.

Figure 4:
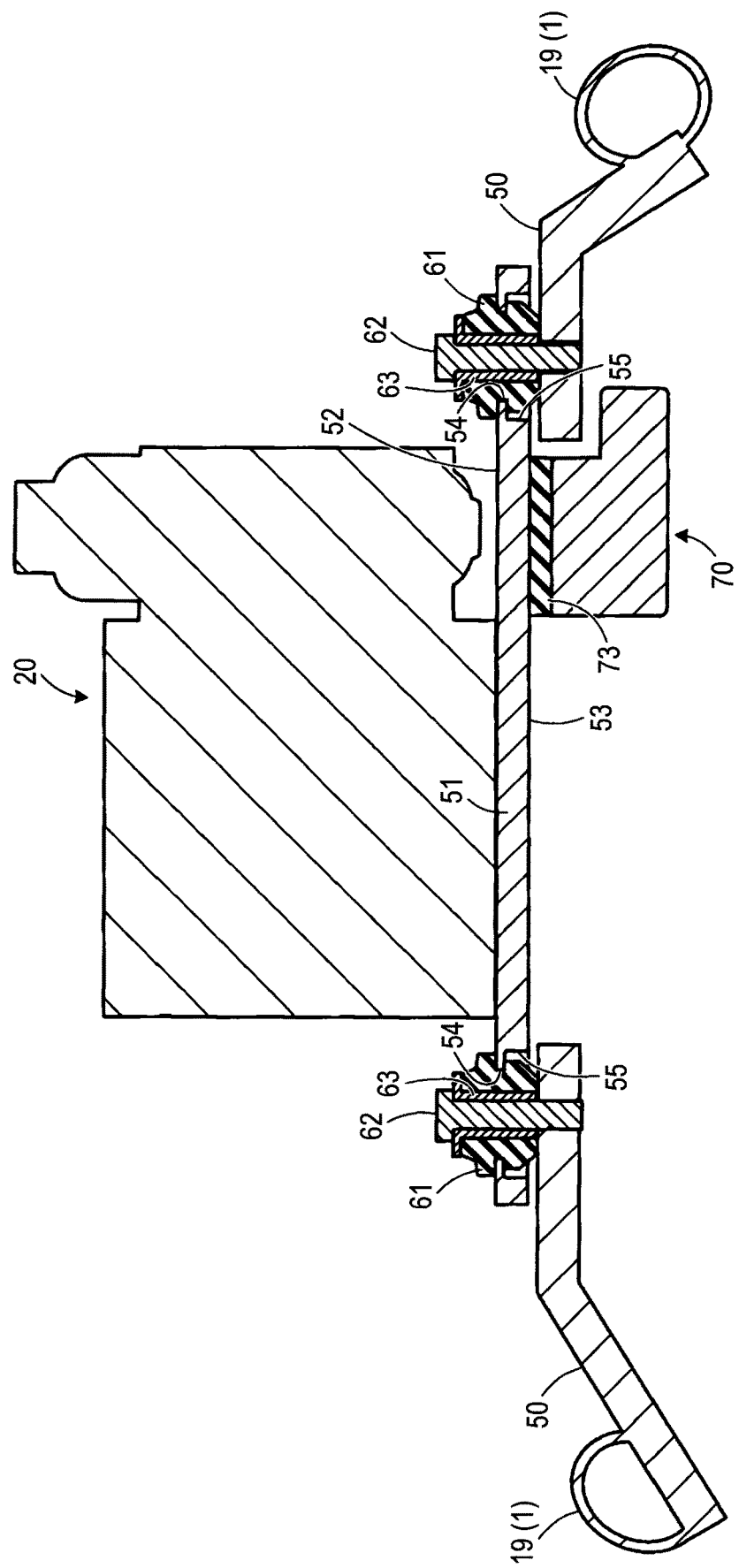
FIG. 4 is a schematic sectional view of the ABS unit attachment structure according to the embodiment.
Figure 5:
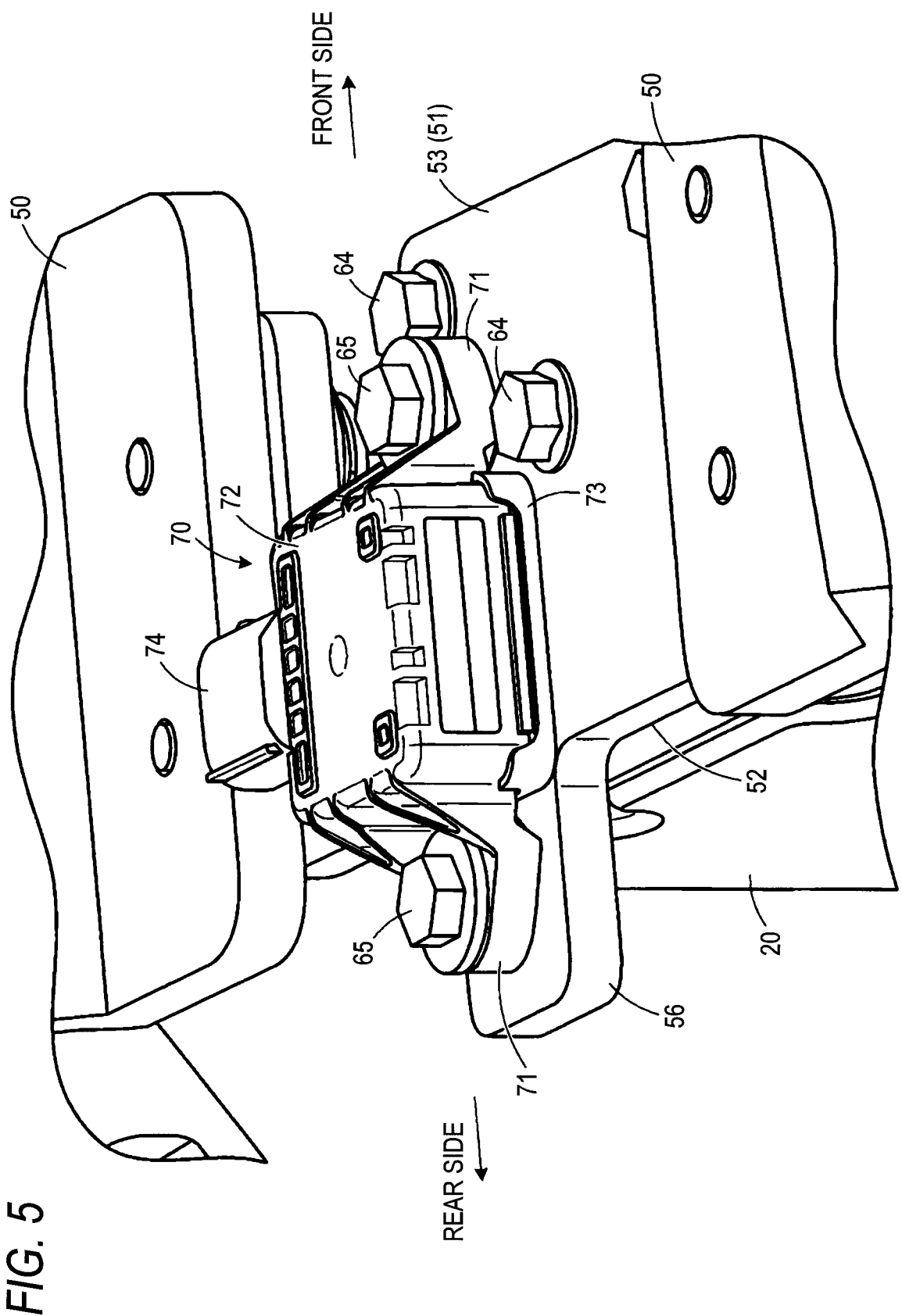
FIG. 5 is a perspective view, as viewed obliquely from below, of an inertial sensor attachment structure according to the embodiment.

An ABS unit/Inertial sensor attachment structure according to the embodiment will be described below with reference to FIGS. 3-6. FIGS. 3 and 4 are a perspective view and a schematic sectional view of the ABS unit attachment structure according to the embodiment, respectively. FIG. 5 is a perspective view, as viewed obliquely from below, of the inertial sensor attachment structure according to the embodiment FIG. 6 is a schematic sectional view of the inertial sensor attachment structure according to the embodiment.

As shown in FIGS. 3 and 4, the floating bracket 51 is fixed to the pair of frame brackets 50 which are fixed to the vehicle body frame 1 by, for example, welding so as to project inward, via the plural rubber bushes 61 using plural bolts 62. More specifically, end portions, to which the rubber bushes 61 are attached, of the floating bracket 51 are attached to the top surfaces of the frame brackets 50, respectively. The left and right end portions of the floating bracket 51 are formed with through-holes 54 in which the respective tubular rubber bushes 61 are inserted, and also formed, on its back surface 53 side, with recesses 55 which are continuous with the respective through-holes 54. When the rubber bushes 61 are inserted in the through-holes 54, upper half portions of the rubber bushes 61 project from the level of the top surface 52 of the floating bracket 51, and lower half portions of the rubber bushes 61 occupy the recesses 55. In this state, bottom portions of the rubber bushes 61 stick downward out of the back surface 53 of the floating bracket 51.

Cylindrical collars 63 are attached to the inner circumferential surfaces of the rubber bushes 61, respectively, and male screw portions of the bolts 62 are inserted through the respective collars 63 and engaged with respective female screws of the frame brackets 50. Since the bottom portions of the rubber bushes 61 stick downward out of the back surface 53 of the floating bracket 51, gaps are formed between the floating bracket 51 and the frame brackets 50. Since the upper half portions of the rubber bushes 61 project from the level of the top surface 52 of the floating bracket 51, the heads of the bolts 62 do not come into direct contact with the floating bracket 51. In this manner, the floating bracket 51 is supported in a floated manner by the frame brackets 50 via the rubber bushes 61.

Figure 6:
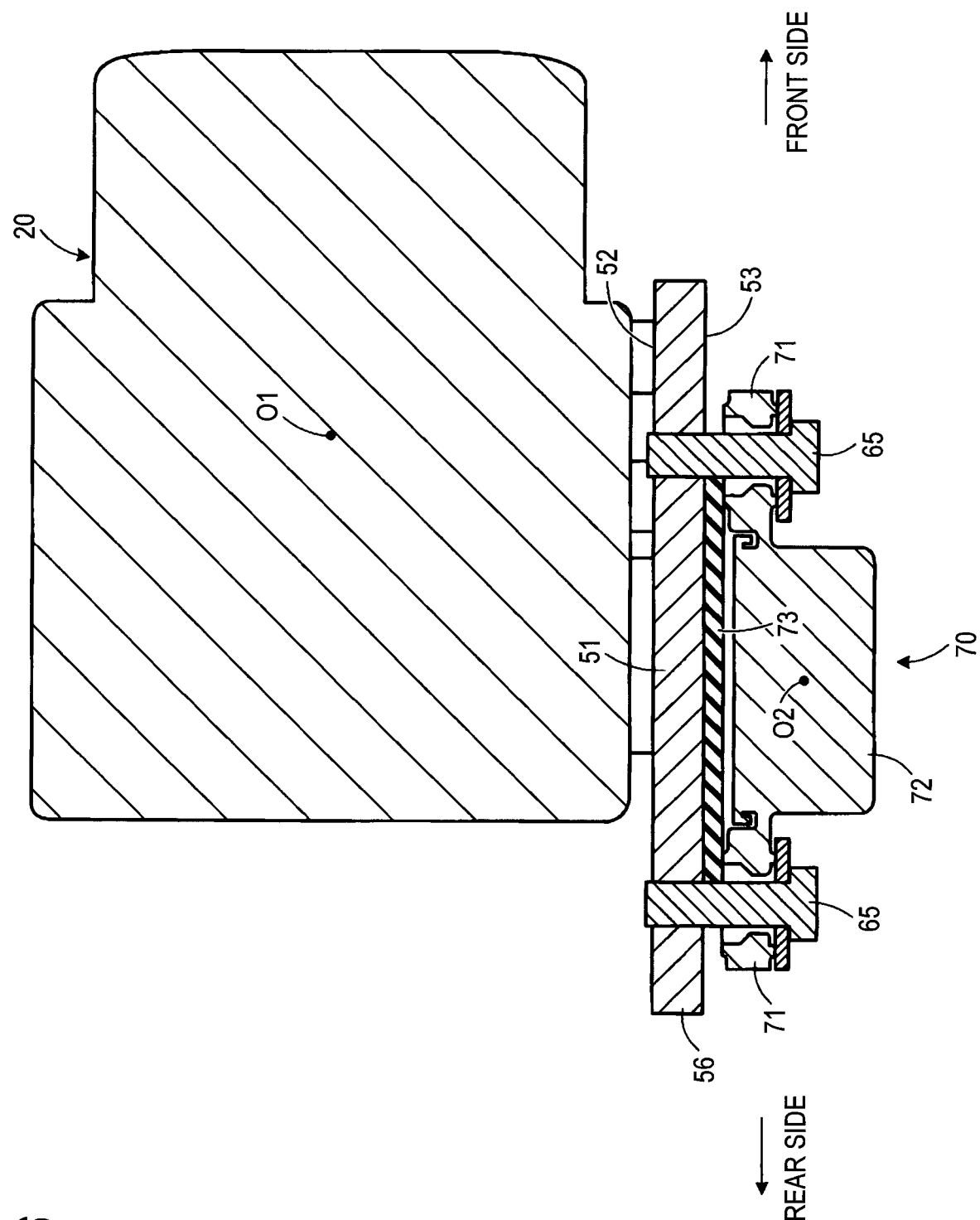
FIG. 6 is a schematic sectional view of the inertial sensor attachment structure according to the embodiment.

As shown in FIGS. 5 and 6, the top surface 52 of the floating bracket 51 is a second attachment surface to which the ABS unit 20 is attached and the ABS unit 20 is fixed to the floating bracket 51 by plural bolts that are inserted into the floating bracket 51 from its back surface 53 side. The back surface (bottom surface) 53 of the floating bracket 51 is a first attachment surface to which the inertial sensor 70 is attached. A portion 56 projects rearward from the floating bracket 51 to increase its attachment surface to thereby secure an installation surface for the inertial sensor 70.

A pair of arms 71 project forward and rearward from a sensor main body 72, and by means of the pair of arms 71 the inertial sensor 70 is supported in a floated manner in such a way that the sensor main body 72 is not in direct contact with the back surface 53 of the floating bracket 51. Whereas the rear cushion unit is offset leftward from the vehicle center line extending in the front-rear direction, the inertial sensor 70 is offset from the center line in the opposite direction, that is, rightward. A harness (described later) which extends from the inertial sensor 70 is routed so as to be also offset rightward from the center line.

A rubber sheet 73 as another vibration absorbing member is sandwiched between the inertial sensor 70 and the back surface 53 of the floating bracket 51. The inertial sensor 70 is fixed to the beck surface 53 of the floating bracket 51 by bolts 65 which are inserted in the two respective arms 72 extending in the vehicle front-rear direction in a state that the rubber sheet 73 is sandwiched between the inertial sensor 70 and the floating bracket 51. That is, the rubber bushes 61 are sandwiched between the floating bracket 51 and the frame brackets 50 and the rubber sheet 73 is sandwiched between the floating bracket 51 and the inertial sensor 70. Therefore, the inertial sensor 70 is supported by the vehicle body frame 1 in a doubly floated manner by means of the rubber bushes 61 and the rubber sheet 73.

The inertial sensor 70 outputs a detection result to the ABS unit 20 via the harness (not shown) which is connected to a coupler 74. Since the inertial sensor 70 is disposed on the back side of the ABS unit 20 with the floating bracket 51 interposed in between, the harness which connects the coupler 74 and the ABS unit 20 is short. Since the floating bracket 51 is shared by the ABS unit 20 and the inertial sensor 70, it is not necessary to use separate brackets for the ABS unit 20 and the inertial sensor 70.

More specifically, as shown in FIGS. 3 and 5, the coupler 74 of the inertial sensor 70 is inserted into the inertial sensor 70 from the right side so as to extend in the connection direction. The harness that is connected to the inertial sensor 70 is routed below the rubber bushes 61 and the frame brackets 50. As a result, the harness extends along such a route as to make only small movements relative to the floating bracket 51 that is vibrating.

In the above-described manner, in addition to the ABS unit 20 the inertial sensor 70 is attached to the floating bracket 51. Since both of the ABS unit 20 and the inertial sensor 70 are fixed to the vehicle body frame 1 via the rubber bushes 61, vibration coming from the vehicle body frame 1 can be absorbed by the rubber bushes 61. In addition, since the ABS unit 20 and the inertial sensor 70 are attached to the floating bracket 51 to increase the total weight of what are attached to it, the floating bracket 51 is made less prone to vibrate and hence vibration to travel from the vehicle body frame 1 to each of the ABS unit 20 and the inertial sensor 70 can be suppressed effectively.

The ABS unit 20 and the inertial sensor 70 are attached to the top surface 52 and the back surface 53 of the floating bracket 51, respectively. Since the ABS unit 20 and the inertial sensor 70 are arranged so as to overlap with each other in a plan view, vibration of the ABS unit 20 and the inertial sensor 70 can be suppressed more effectively by bringing the center of gravity O2 of the inertial sensor 70 closer to the center of gravity O1 of the ABS unit 20. The inertial sensor 70 may be fixed by screwing bolts into female screws that are formed in the ABS unit 20. In this case, the number of components can be decreased further, resulting in further cost reduction.

Whereas the ABS unit 20 is fixed to the top surface 52 the floating bracket 51 so as to be in contact with it, the inertial sensor 70 is fixed to the back surface 53 of the floating bracket 51 via the rubber sheet 73. The ABS unit 20 itself vibrates while being driven. By inserting the rubber sheet 73 between the inertial sensor 70 and the back surface 53 of the floating bracket 51, vibration to travel from the ABS unit 20 to the inertial sensor 70 while the ABS unit 20 is driven can be suppressed being absorbed by the rubber sheet 73. Furthermore, since as described above the inertial sensor 70 is supported by the vehicle body frame 1 in a doubly floated manner by means of the rubber bushes 61 and the rubber sheet 73, the transmission of vibration from the vehicle body frame 1 to the inertial sensor 70 can be suppressed more effectively.

Since vibration of the ABS unit 20 is suppressed by the floating bracket 51, the ABS unit 20 can be disposed at a position where it would otherwise be difficult to satisfy the vibration conditions. On the other hand, whereas vibration of the inertial sensor 70 is suppressed by the floating bracket 51 as in the case of the ABS unit 20 and hence the inertial sensor 70 can also be disposed at a position where it would otherwise be difficult to satisfy the vibration conditions, taking the detection accuracy of the inertial sensor 70 into consideration it is preferable that the floating bracket 51 be disposed near the center of the vehicle body frame 1 (see FIG. 1). Therefore, in the embodiment, the floating bracket 51 is disposed in the rear of the rear cushion unit (not shown) in a state that the ABS unit 20 and the inertial sensor 70 are attached to it.

Where the floating bracket 51 is disposed near the center of the vehicle body frame 1, the inertial sensor 70 is disposed near the center of gravity of the vehicle body and hence the detection accuracy of the inertial sensor 70 can be increased. Furthermore, the floating bracket 51 is disposed on the vehicle center line extending in the front-rear direction. Therefore, the ABS unit 20 and the inertial sensor 70 are also located on the center line, whereby the vehicle weight is balanced well in the width direction to increase the stability of steering. Furthermore, since the ABS unit 20 and the inertial sensor 70 are combined by the floating bracket 51 into a single unit, work of attaching the ABS unit 20 and the inertial sensor 70 is made easier than in a case of attaching them to the vehicle body frame 1 individually.

As described above, in the embodiment, since the floating bracket 51 is supported by the vehicle body frame 1 in a floated manner via the rubber bushes 61, vibration coming from the vehicle body frame 1 is absorbed by the rubber bushes 61. The floating bracket 51 is made less prone to vibrate because the total weight of what are supported by the floating bracket 51 is increased by the weights of the ABS unit 20 and the inertial sensor 70 which are attached to the floating bracket 51. Therefore, vibration coming from the vehicle body frame 1 is made less prone to travel to the inertial sensor 70, which means that an effective vibration preventive measure has been taken for the inertial sensor 70. Furthermore, the layout involving the inertial sensor 70 is not restricted by the vibration preventive measure and, instead, is increased in the degree of freedom. Still further, since the floating bracket 51 is shared by the ABS unit 20 and the inertial sensor 70, it is not necessary to use separate brackets for them and hence the number of components is reduced, thus enabling reduction in weight and cost.

The invention is not limited to the above embodiment and various modifications are possible. The sizes and shapes of the members employed in the embodiment are not restricted to those shown in the accompanying drawings and can be changed as appropriate as long as the advantages of the invention can be attained. Other modifications can also be made as appropriate as long as the object of the invention is attained.

For example, although in the embodiment the inertial sensor 70 is attached to the back surface 53 (first attachment surface) of the floating bracket 51 and the ABS unit 20 is attached to the top surface 52 (second attachment surface) of the floating bracket 51, the invention is not limited to this configuration. A configuration is possible in which the inertial sensor 70 is attached to the top surface 52 of the floating bracket 51 and the ABS unit 20 is attached to the back surface 53 of the floating bracket 51.

Although in the embodiment the floating bracket 51 is a flat plate that is parallel with the left-right direction and whose back surface 53 and top surface 52 serve as the first attachment surface and the second attachment surfaces, respectively, the invention is not limited to this configuration. There are no particular limitations on the shape of the floating bracket 51. For example, the floating bracket 51 may be an L-shaped plate having surfaces that are parallel with the left-right direction and surfaces that extend vertically from edges of the above surfaces and are parallel with the vertical direction. In this case, a side surface, perpendicular to the vehicle left-right direction, of the floating bracket 51 may serve as the first attachment surface or the second attachment surface.

Although the embodiment is directed to the inertial sensor 70 for the ABS unit 20, the invention is not limited to this case. The invention may be applied to a sensor that is used for engine control or vehicle body control such as traction control or wheelie control, instead of the inertial sensor 70. That is, the concept represented by the term "inertial sensor 70" includes an acceleration sensor, an angular velocity sensor, yaw rate sensor, etc.

Although in the embodiment the floating bracket 51 is fixed to the vehicle body frame 1 via the rubber bushes 61 which are vibration absorbing members, the invention is not limited to this configuration. It suffices that the vibration absorbing members be made of a material capable of absorbing vibration to travel from the vehicle body frame 1 to the floating bracket 51; for example, they may be elastic bodies such as springs or be made of a foam material such as sponge.

Although in the embodiment the inertial sensor 70 is fixed to the floating bracket 51 via the rubber sheet 73 which is the other absorbing member, the invention is not limited to this configuration. It suffices that the other vibration absorbing member be made of a material capable of absorbing vibration to travel from the floating bracket 51 to the inertial sensor 70; for example, it may be an elastic body such as a spring or be made of a foam material such as sponge. Vibration absorbing members like the above-described rubber bushes 61 may be used for attaching the arms 71 of the inertial sensor 70 to the floating bracket 51.

Although in the embodiment the inertial sensor 70 is attached to the floating bracket 51 for the ABS unit 20, the invention is not limited to this configuration. The ABS unit 20 may be attached to a floating bracket for the inertial sensor 70. The floating bracket 51 may be configured so that in addition to the inertial sensor 70 an ECU (engine control unit) or an exhaust valve actuator can be attached to it.

Although in the embodiment the inertial sensor 70 is fixed to the back surface 53 of the floating bracket 51 via the rubber sheet 73, the invention is not limited to this configuration. Where vibration to travel from the vehicle body frame 1 to the inertial sensor 70 can be absorbed sufficiently by the rubber bushes 61 and vibration that occurs while the ABS unit 20 is driven is not serious, the inertial sensor 70 may be fixed to the floating bracket 51 without intervention of the rubber sheet 73.

Although in the embodiment the floating bracket 51 is disposed near the center of the vehicle body frame 1, the invention is not limited to this configuration. The floating bracket 51 may be disposed at any position in the vehicle body frame 1 as long as the detection accuracy of the inertial sensor 70 can be kept in a prescribed range.

Providing the above-described advantage that the transmission of vibration to an inertial sensor can be suppressed sufficiently, the invention is particularly useful when applied to inertial sensor attachment structures for motorcycles.

What is claimed is:

1. An inertial sensor attachment structure comprising:
    a floating bracket, connected to a vehicle body frame via a vibration absorbing member configured to absorb a vibration coming from a vehicle body frame, and supporting an inertial sensor, wherein
    the inertial sensor is attached to the floating bracket together with a component so as to increase a weight of components supported by the floating bracket, so that a natural frequency is lowered and the floating bracket is made less prone to vibrate.

2. The inertial sensor attachment structure according to claim 1, wherein
    the floating bracket is supported by the vehicle body frame via another part fixed to the vehicle body frame.

3. The inertial sensor attachment structure according to claim 1, wherein
    the vehicle body frame is a seat rail or a subframe.

4. The inertial sensor attachment structure according to claim 1, wherein
    the floating bracket is located at a position that is in a rear of a rear cushion unit for suspension of a rear wheel.

5. The inertial sensor attachment structure according to claim 1, wherein
    the component is an ABS unit.

6. The inertial sensor attachment structure according to claim 5, wherein
    the ABS unit is located in front of a front end of a rear wheel.

7. The inertial sensor attachment structure according to claim 1 wherein
    another vibration absorbing member is sandwiched between the inertial sensor and the floating bracket.

8. The inertial sensor attachment structure according to claim 1, wherein
    the inertial sensor is attached to the floating bracket which is supported by the vehicle body frame via the vibration absorbing member in a floated manner, via another vibration absorbing member.

9. The inertial sensor attachment structure according to claim 3, wherein
    the inertial sensor and the component are disposed in a space surrounded by the seat rail and the subframe.

10. The inertial sensor attachment structure according to claim 4, wherein
    the floating bracket is disposed on a center line which extends in a front-rear direction of a vehicle body through a center of the vehicle body in a width direction of the vehicle body.

11. An inertial sensor attachment structure comprising:
    a floating bracket supporting an inertial sensor via a vibration absorbing member configured to absorb a vibration coming from a vehicle body frame, wherein
    the inertial sensor is attached to the floating bracket together with a component so as to increase a weight of components supported by the floating bracket, so that a natural frequency is lowered and the floating bracket is made less prone to vibrate; and
    another vibration absorbing member is sandwiched between the inertial sensor and the floating bracket.

12. An inertial sensor attachment structure comprising:
    a floating bracket supporting an inertial sensor via a vibration absorbing member configured to absorb a vibration coming from a vehicle body frame, wherein
    the inertial sensor is attached to the floating bracket together with a component so as to increase a weight of components supported by the floating bracket, so that a natural frequency is lowered and the floating bracket is made less prone to vibrate, and
    the component is an ABS unit.

* * * * *